(12) United States Patent
    Lou et al.

(10) Patent No.: US 10,783,676 B2
(45) Date of Patent: Sep. 22, 2020

(54) PROCESSING METAL ARTIFACTS IN CT IMAGE

(71) Applicant: Beijing Neusoft Medical Equipment Co., Ltd., Beijing (CN)

(72) Inventors: Shanshan Lou, Shenyang (CN); Liang Ren, Shenyang (CN); Ling Pang, Shenyang (CN)

(73) Assignee: Beijing Neusoft Medical Equipment Co., Ltd., Beijing (CN)

( * ) Notice: Subject to any disclaimer, the term of this patent is extended or adjusted under 35 U.S.C. 154(b) by 42 days.

(21) Appl. No.: 16/172,894

(22) Filed: Oct. 29, 2018

(65) Prior Publication Data

US 2019/0130610 A1    May 2, 2019

(30) Foreign Application Priority Data

Oct. 30, 2017 (CN) .......................... 2017 1 1034156

(51) Int. Cl.
   *G06K 9/00* (2006.01)
   *G06T 11/00* (2006.01)
   (Continued)

(52) U.S. Cl.
   CPC .............. *G06T 11/008* (2013.01); *G06T 5/20* (2013.01); *G06T 5/50* (2013.01); *G06T 7/11* (2017.01);
   (Continued)

(58) Field of Classification Search
   CPC ......... G06T 7/0012; G06T 2207/30004; G06T 2207/30016; G06T 2207/30032; G06T 2207/30092; G06T 2207/30096; G06T 2207/30101; G06T 2207/10072; G06T 2207/10081; G06T 2207/20; G06T 2207/20004; G06T 2207/20021; G06T 2207/20012; G06T 2207/20081; G06T 2207/20084; G06T 7/0014; G06T 15/08; G06T 11/008; G06T 7/11; G06T 5/20;
   (Continued)

(56) References Cited

U.S. PATENT DOCUMENTS

| 2011/0082366 A1* | 4/2011 | Scully ...................... A61B 5/06 600/424 |
| 2013/0101079 A1* | 4/2013 | Hough ..................... A61B 6/03 378/8 |

(Continued)

*Primary Examiner* — Duy M Dang
(74) *Attorney, Agent, or Firm* — Kilpatrick Townsend & Stockton, LLP

(57) ABSTRACT

A method and a device for processing metal artifacts in a CT image are provided. In an example, the method includes: a first image is obtained before a metal probe is intervened; second raw data and a second image corresponding to the second raw data are obtained after the metal probe is intervened; a third image of a metal region in the second image is obtained; channels corresponding to the metal region are determined; CT values of the metal region in the second image are set to a preset value to obtain a model image and model raw data corresponding to the model image; data at the channels in the second raw data is replaced with data at the channels in the model raw data to obtain a replaced second raw data; and based on the replaced second raw data and the third image, a target image is obtained.

20 Claims, 2 Drawing Sheets

(51) Int. Cl.
*G06T 7/11* (2017.01)
*G06T 5/50* (2006.01)
*G06T 5/20* (2006.01)

(52) U.S. Cl.
CPC .............. *G06T 2207/10081* (2013.01); *G06T 2207/20224* (2013.01)

(58) Field of Classification Search
CPC ........... G06T 5/50; G06T 5/002; G06T 5/005; G06T 5/006; G06T 2207/20182; G06T 2207/20204; G06N 20/00; G06N 3/084; G16H 30/20; A61B 6/463; A61B 6/466; A61B 6/5217; A61B 6/5294; G06K 9/40; G06K 2009/363
See application file for complete search history.

(56) References Cited

U.S. PATENT DOCUMENTS

| | | | |
|---|---|---|---|
| 2016/0063686 A1* | 3/2016 | Lou ..................... | A61B 6/5258 382/131 |
| 2016/0163071 A1* | 6/2016 | Han ..................... | G06T 11/008 382/131 |

* cited by examiner

PROCESSING METAL ARTIFACTS IN CT IMAGE

CROSS REFERENCE TO RELATED APPLICATIONS

This application claims priority to Chinese Patent Application No. 201711034156.1, filed on 30 Oct. 2017, the entire content of which is incorporated herein by reference.

BACKGROUND

Computed Tomography (CT) equipment is commonly used in the medical field. When using the CT equipment, the CT equipment scans a subject by X-rays, X-rays are attenuated by the subject when passing through the subject, the attenuated X-rays are detected by a detector and converted into a data signal, which is referred to as raw data, and a CT image is reconstructed with the raw data.

In clinical applications, the subject can be a patient. When a CT scan is performed on the patient, there is a case that a metal part is intervened into the patient, for example, a surgical probe is intervened into the subject. In this case, due to the high attenuation characteristics of metal to X-rays, it may cause that the obtained data signal has error and thus the reconstructed CT image has metal artifacts. The metal artifacts may refer to radial fine lines emitted from the metal part, which can reduce the quality of the reconstructed image and thus the metal artifacts are needed to be removed.

NEUSOFT MEDICAL SYSTEMS CO., LTD. (NMS), founded in 1998 with its world headquarters in China, is a leading supplier of medical equipment, medical IT solutions, and healthcare services. NMS supplies medical equipment with a wide portfolio, including CT, Magnetic Resonance Imaging (MRI), digital X-ray machine, ultrasound, Positron Emission Tomography (PET), Linear Accelerator (LINAC), and biochemistry analyser. Currently, NMS' products are exported to over 60 countries and regions around the globe, serving more than 5,000 renowned customers. NMS's latest successful developments, such as 128 Multi-Slice CT Scanner System, Superconducting MRI, LINAC, and PET products, have led China to become a global high-end medical equipment producer. As an integrated supplier with extensive experience in large medical equipment, NMS has been committed to the study of avoiding secondary potential harm caused by excessive X-ray irradiation to the subject during the CT scanning process.

DETAILED DESCRIPTION

The technical solutions in examples of the present application will be clearly and completely described in the following with reference to the drawings in examples of the present application. It is apparent that the described examples are only a part of the examples of the present application, and not all of them. Based on the examples in the present application, all other examples obtained by those skilled in the art without creative efforts are within the scope of the present application.

In an example, metal artifacts in a reconstructed CT image are removed based on a filtering back projection (FBP) reconstruction method. In the FBP method, the CT image reconstructed by raw data is divided by a CT threshold segmentation scheme to extract a metal region; the raw data corresponding to the metal region is corrected to obtain corrected raw data; and then a CT image without metal artifacts is reconstructed with the corrected raw data. However, because condition of various subjects is different, the metal region extracted by the same threshold segmentation scheme may be inaccurate and thus the CT image without metal artifacts is inaccurate, thereby affecting the quality of the CT image.

A threshold in the CT threshold segmentation scheme is set according to the difference between CT values of the metal region and CT values of other substance regions except the metal region, so as to distinguish the metal region and other substance regions. Because conditions of various subjects are different, it may cause that the difference between the CT values of the metal region and the CT values of other substance regions is different. In this case, when the threshold is set, it may occur that a region not belonging to the metal region is divided into the metal region, or a region belonging to the metal region is omitted. Therefore, the extracted metal region is inaccurate and thus the CT image without metal artifacts is inaccurate, thereby affecting the quality of the CT image.

Figure 1:
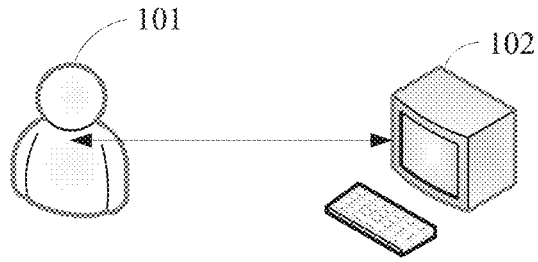
FIG. 1 is a schematic diagram of an application scenario of a method of processing metal artifacts in a CT image according to one or more examples of the present disclosure.

A method of processing metal artifacts in a CT image is provided in the present disclosure, which can be applied in the scenario as shown in FIG. 1. In the scenario, a user 101 (such as, a doctor or an operator) may interact with a user terminal 102 (such as, a computer). For example, the user 101 may operate the user terminal 102. The user terminal 102 may be configured to perform corresponding actions or steps in response to the operation of the user 101 and render a reconstructed CT image to the user 101. The reconstructed CT image is displayed on a displaying device (such as, the user terminal 102).

In an example, the user 101 pre-sets a scanning condition on the user terminal 102. Under the scanning condition, the user terminal 102 is configured to obtain a first image before a metal probe is intervened into the subject, second raw data and a second image corresponding to the second raw data after the metal probe is intervened into the subject. The user terminal 102 is further configured to obtain a third image of a metal region in the second image by image processing according to the first image and the second image. The user terminal 102 is further configured to determine channels corresponding to the metal region according to the third image. The user terminal 102 is further configured to obtain a model image and model raw data corresponding to the model image by setting CT values of the metal region in the second image to a preset value. The preset value is different from a CT value of each of substances in the second image. The user terminal 102 is further configured to replace data at the channels corresponding to the metal region in the second raw data with data at the channels at the channels corresponding to the metal region in the model raw data, so as to obtain replaced second raw data. The user terminal 102 is further configured to obtain a fourth image based on the replaced second raw data. The user terminal 102 is further configured to obtain a target image by combining the third image with the fourth image and render the target image to the user 101. The target image is a CT image in which the metal artifacts are removed, so that the user 101 can diagnose the subject according to the target image presented by the user terminal 102.

It is noted that the above application scenario is merely for the purpose of facilitating understanding of the present disclosure, and examples of the present disclosure are not limited in this respect. Rather, examples of the present disclosure can be applied to any scenario that is applicable.

The following describes in detail how to process metal artifacts in a CT image in conjunction with the drawings.

Figure 2:
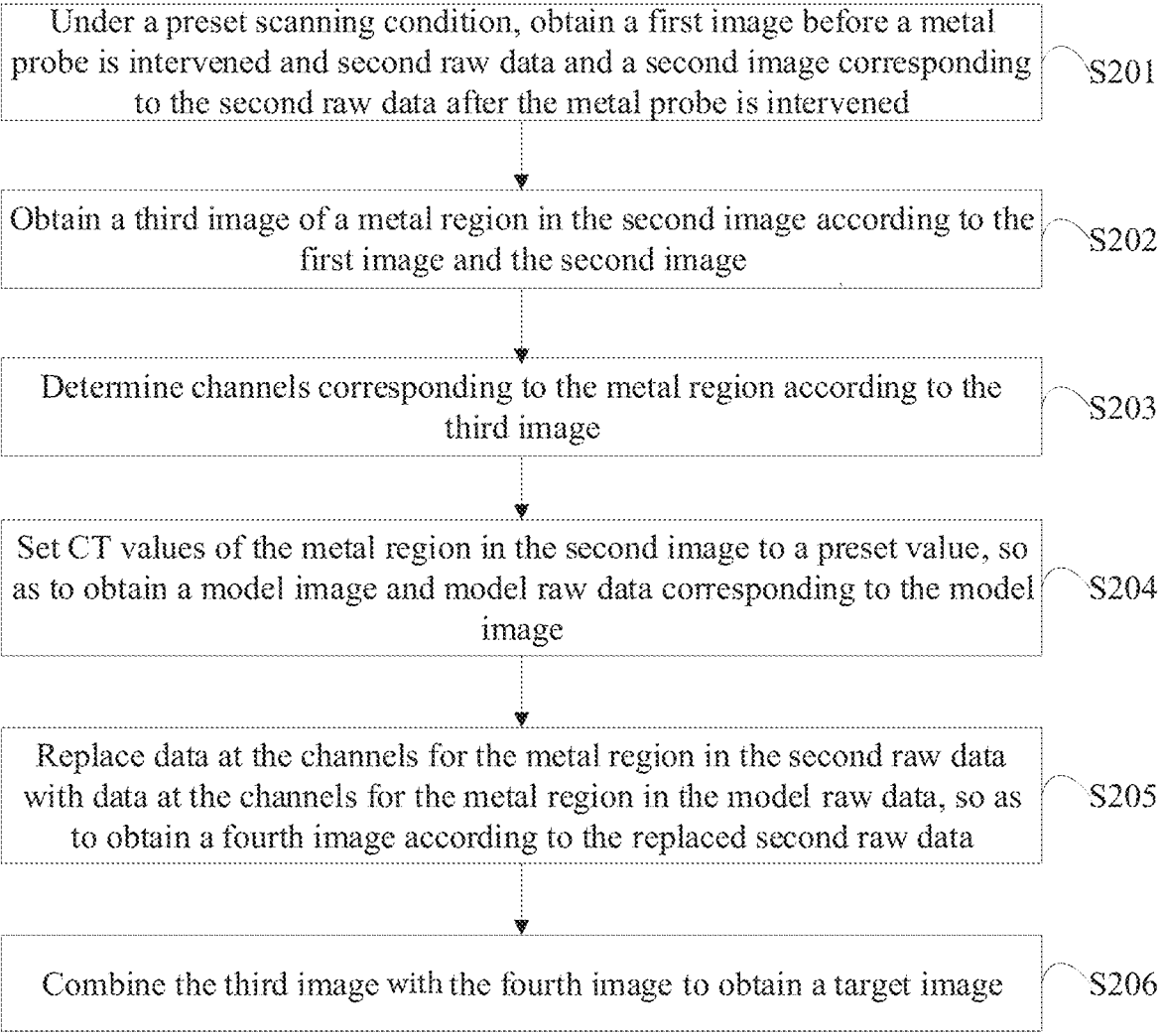
FIG. 2 is a flow diagram of a method of processing metal artifacts in a CT image according to one or more examples of the present disclosure.

Referring to FIG. 2, it is a flow diagram of a method of processing metal artifacts in a CT image according to one or more examples of the present disclosure. A process of the method includes steps S201-S206.

At step S201, under a preset scanning condition, before a metal probe is intervened into a subject, a first image is obtained by scanning the subject; and under the preset scanning condition, after the metal probe is intervened into the subject (that is, the metal probe is placed into the subject), second raw data and a second image corresponding to the second raw data is obtained by scanning the subject.

In clinical application, when the subject is scanned by the CT equipment, if the metal probe has been intervened into the subject, then the reconstructed CT image will have metal artifacts, which will negatively affect the quality of the reconstructed CT image and how the medical staff diagnose the subject according to the reconstructed CT image. In this example, in order to remove the metal artifacts in the reconstructed CT image, the metal region shall be firstly determined. Since before and after the metal probe is intervened into the subject, two CT images obtained by scanning the subject are different. Therefore, to determine the metal region and perform subsequent artifacts removal, the user terminal 102 is configured to obtain the first image before the metal probe is intervened into the subject, and obtain the second raw data and the second image corresponding to the second raw data after the metal probe is intervened into the subject.

It is noted that, the CT scan before the metal probe is intervened into the subject and the CT scan after the metal probe is intervened into the subject are performed under the same scanning condition, such that the first image and the second image are comparable. The scanning condition may include channel number, slice number, projection number and so on.

For example, before the metal probe is intervened into the subject, in the preset scanning condition, the subject is scanned by the CT equipment, and the user terminal 102 is configured to obtain the first image of the subject. After the metal probe is intervened into the subject, in the above scanning condition, the subject is scanned by the CT equipment, and the user terminal 102 is configured to obtain the second raw data and the second image corresponding to the second raw data, for use in subsequent processes. X-rays passing through the subject are detected by a detector of the CT equipment and converted into raw data. The detector may transmit the raw data to the user terminal 102.

At step S202, a third image of a metal region in the second image is obtained according to the first image and the second image.

The user terminal 102 can be configured to perform image processing on the first image and the second image, so as to obtain the third image of the metal region in the second image.

Since the difference between the first image and the second image is that the second image includes the metal probe and the metal artifacts caused by the metal probe, when the user terminal 102 is configured to perform image processing on the first image and the second image, by taking the first image as a background image, a difference image between the second image and the background image is obtained. The difference image includes the metal probe (hereinafter, may also be referred to as the metal region) and the metal artifacts caused by the metal region. Then, since there is a difference between CT values of the metal region and CT values of the metal artifacts, the user terminal 102 may be configured to remove the metal artifacts in the difference image by filtering the CT values of the metal region. In this way, the metal region in the difference image is filtered out and the third image only includes the metal region, without the metal artifacts. For example, the CT values of the metal region is larger than 1000 Hounsfield unit (HU), the CT values of the soft tissue region are less than 1000 HU, the CT values of the metal artifacts are not fixed. The range of the CT values of the metal artifacts is relatively large, e.g., from negative to positive. Filtering the CT values of the metal region refers to obtaining pixel points of CT value larger than 1000 HU in the difference image. In this way, the third image only includes the pixel points of CT value larger than 1000 HU. In an example, it is assumed that the first image includes a pixel point of CT value larger than 1000 HU. To avoid that the pixel point of CT value larger than 1000 HU in the first image is taken or divided into the metal region, the first image can be taken as the background image. The difference image between the second image and the background image can be obtained. CT values of the difference image can be filtered to determine the metal region, thereby improving the accuracy of the determined metal region.

At step S203, channels corresponding to the metal region are determined according to the third image.

It is understood that orthographic projection can be performed on an image to obtain raw data corresponding to the image. Therefore, the user terminal 102 can be configured to perform orthographic projection on the third image to obtain the raw data corresponding to the third image, that is, the raw data for the metal region. According to a correspondence between the raw data for the metal region and channels corresponding to the metal region, the channels corresponding to the metal region in the second raw data are determined. The channels corresponding to the metal region covers the entire metal region, and includes a channel starting position and a channel ending position corresponding to the metal region. A channel refers to a unit of data acquisition in the CT equipment, such as a detector unit. It is assumed that if the CT equipment includes 128*672 detector units, there are 128*672 channels. The CT device stores the correspondence between raw data and channel. It is noted that data at the channels corresponding to the metal region in the second raw data includes metal raw data and metal artifacts raw data.

At step S204, a model image and model raw data corresponding to the model image are obtained by setting CT values of the metal region in the second image to a preset value. The preset value is different from a CT value of each of substances in the second image.

At step S204, the model image is obtained by processing the second image. In some examples, the CT values of the metal region in the second image are set to a preset value to obtain the model image. The preset value is different from a CT value of each of substances in the second image. In this way, the CT value of the metal region in the model image is uniform. Accordingly, data of the metal region in the model raw data for the model image is idealized.

In other examples, when the CT values of the metal region in the second image are set to the preset value, CT values of other regions except the metal region in the second image are further processed. Other regions in the second image refer to non-metallic regions in the second image. For example, the CT values of each of other regions in the second image are replaced with a designated CT value for the other region. In another example, if the other regions include a bone region, the CT values of each of other regions except the bone region are replaced with a designated CT value for the other region. In this way, the noise of non-metallic substances can be eliminated, the quality of the model image can be improved, and thus the quality of the model raw data corresponding to the model image can be improved.

Figure 3:
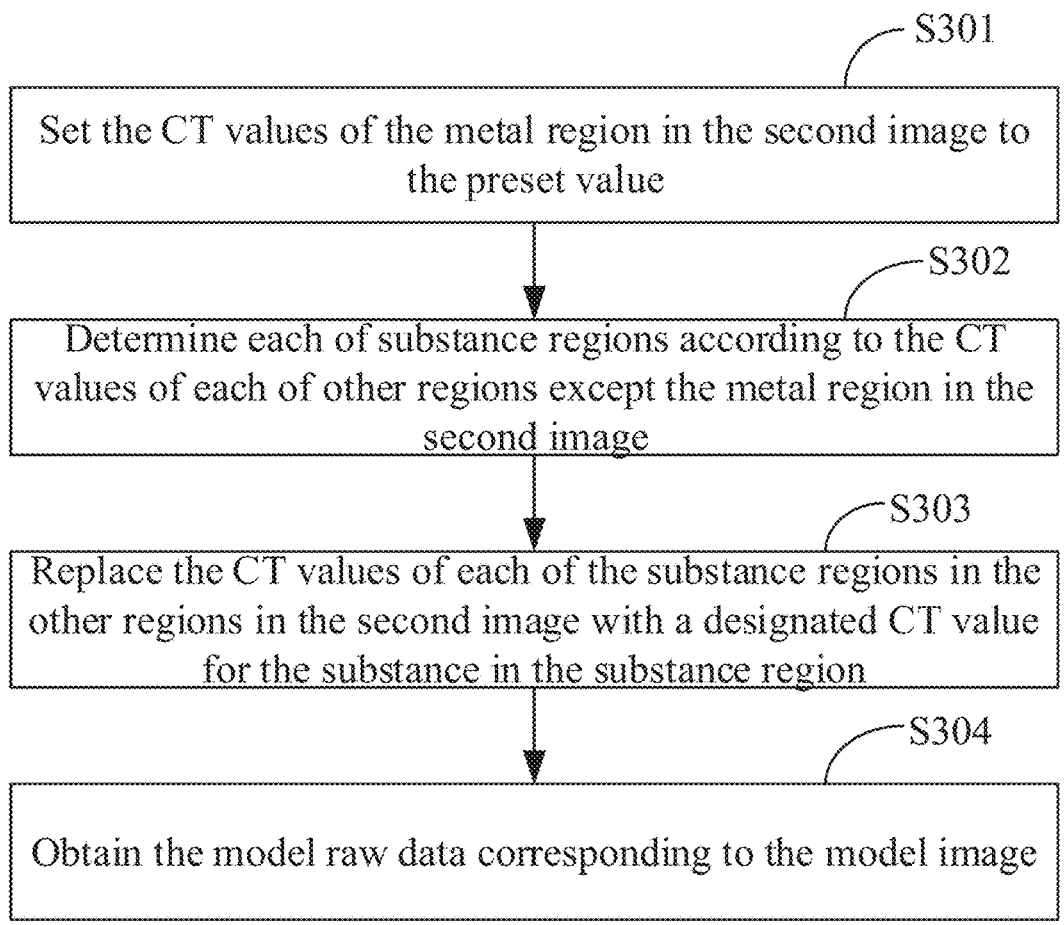
FIG. 3 is a flow diagram of a method of obtaining a model image according to one or more examples of the present disclosure.

FIG. 3 is a flow diagram of a method of obtaining a model image according to one or more examples of the present disclosure. A process of the method of obtaining the model image includes steps S301-S304.

At step S301, the CT values of the metal region in the second image are set to the preset value. The preset value is different from a CT value of each of substances in the second image.

When reconstructing the model image, the user terminal 102 is configured to divide the second image into the metal region and a plurality of non-metallic regions, replace the CT values of the metal region in the second image with the preset value. Since the second image includes the metal region and metal artifacts caused by the metal region, the first image (the background image) does not include the metal region. Therefore, the user terminal 102 is configured to determine the metal region in the second image by comparing CT values of the first image with CT values of the second image. Then the user terminal 102 is configured to set the CT values of the metal region to the preset value, so as to define or obtain the metal region of the model image. The preset value may be a CT value of water, or other CT value that is different from the CT value of each of the substances in the second image.

At step S302, according to the CT values of each of other regions except the metal region in the second image, each of substance regions is determined.

Other regions refer to non-metallic regions in the second image. To reconstruct the model image, the user terminal 102 is configured to determine each of the non-metallic regions in the second image. That is, the other regions except the metal region are divided into different substance regions. The CT values of the respective substance regions in other regions are replaced with a designated CT value for the substance region. In an example, by setting CT thresholds, the user terminal 102 is configured to divide the non-metallic regions in the second image into different substance regions.

The CT thresholds may be set according to the substance included in each of the non-metallic regions in the second image. For example, the number m of CT thresholds is determined according to the number n of substance types included in the non-metal regions in the second image. For example, if the number n of substance types included in the non-metal regions in the second image is 3, two CT thresholds are set to distinguish different substance regions. That is, n=m+1, m is an integer greater than or equal to 1. Each CT threshold may be determined according to the distribution range of the CT values of the substance in each of the non-metallic regions in the second CT image, or according to an empirical value. The CT values of the non-metallic regions are divided into n number of regions by (n−1) CT thresholds. Each of the non-metallic regions represents a substance. The non-metal regions are divided into n number of substance regions corresponding to n number of substances.

In some cases, the non-metallic regions in the second image may include an air region, a soft tissue region, and a bone region. The user terminal 102 is configured to distinguish the three substance regions: the air region, the soft tissue region and the bone region. According to the above-mentioned CT threshold setting method, two CT thresholds, that is, a first threshold and a second threshold, may be set. The user terminal 102 is configured to distinguish the soft tissue region and the air region by the first threshold, and distinguish the soft tissue region and the bone region by the second threshold.

At step S303, the CT values of each of the substance regions in the other regions in the second image are replaced with a designated CT value for the substance in the substance region.

In an example, the CT values of each of the substance regions in the other regions are replaced, thereby generating the model image. In this way, compared with the model image generated only by replacing the CT values of the metal region, the model image generated by replacing the CT values of each of the substance regions has lower noise. The data of the metal region in the model raw data is idealized. In subsequent steps, the data of the metal region in the second raw data is replaced with the data of the metal region in the model raw data, so as to obtain replaced second raw data. The data of the metal region in the model raw data does not include artifacts data because the model image does not include artifacts. A fourth image is reconstructed with the replaced second raw data. It is noted that the fourth image does not include the metal artifacts because the data of the metal region in the second raw data includes metal raw data and metal artifacts raw data. The metal raw data and the metal artifacts raw data both corresponds to the channels for the metal region.

In another example, if the substance regions include a bone region, the CT values of each of the substance regions in the other regions except the bone region are replaced with a designated CT value for the substance in the substance region. Due to the particularity of the bone substance, the bone region may maintain the original CT values without replacement, so as to generate the model image. In this case, the model image also has relatively low noise.

After the non-metallic regions in the second image are divided into different substance regions with the CT thresholds, since the CT values of the respective pixel points may be different even in the same substance region, in order to make the CT values corresponding to the same substance region uniform, the CT values of the respective pixel points in each of the substance regions in the non-metallic regions may be replaced with the designated CT value for the substance in the substance region. For example, the CT values of the respective pixel points in the soft tissue region is replaced with a designated CT value for the soft tissue, and the CT values of the respective pixel points in the air region is replaced with a designated CT value for the air.

Taking a case in which the non-metallic regions in the second image include the air region, the soft tissue region, and the bone region as an example, when the air region, the soft tissue region, and the bone region are distinguished with the first threshold and the second threshold, the user terminal 102 is configured to replace the CT values of the respective pixel points in the air region with designated CT value for the air, and replace the CT values of the respective pixel points in the soft tissue region with the designated CT value for the soft tissue. Further, the CT values of the respective pixel points in the bone region can be replaced with a designated CT value for the bone in the bone region. Alternatively, the CT values of the respective pixel points in the bone region may keep unchanged.

It is noted that the designated CT value for the substance region may be a uniform value of the CT value of each of the pixel points in the substance region.

The uniform value may be a mean value of the CT value of each of the pixel points in the substance region; or an expected value of a normal distribution when the CT value of each of the pixel points in the substance region follows the normal distribution; or the CT value which is the most frequently repeated in the substance region.

In an example, the user terminal 102 is configured to replace the CT values of the respective pixel points in the air region with the mean value of the CT values of the respective pixel points in the air region, to replace the CT values of the respective pixel points in the soft tissue region with the mean value of the CT values of the respective pixel points in the soft tissue region, and to replace the CT values of the respective pixel points in the bone region with the mean value of the CT values of the respective pixel points in the bone region, or alternatively not change the CT values of the respective pixel points in the bone region. The designated CT value for the substance region may refer to a uniform value which can represent the CT value of each of the pixel points in the substance region. The designated CT value for the substance region may be a uniform value of the CT value of each of the pixel points in the substance region. The uniform value can represent the true CT value of the substance in the substance region in the second image. The mean value, the expected value, or the CT value which is the most frequently repeated in the substance region can represent the substance in the substance region. In this way, after the CT values of each of the substance regions are replaced with the corresponding designated CT value, the designated CT value corresponding to the substance region can accurately represent the substance in the substance region, and an image corresponding to the substance region is a uniform image, thereby generating the ideal model image.

In step S304, the model raw data corresponding to the model image is obtained.

The orthographic projection is performed on the model image to obtain the raw data corresponding to the model image (may also be referred to as model raw data).

Since the CT values of each of substance regions in the second image are replaced with the corresponding designated CT value and thus the CT value of each of substance regions in the model image is uniform, the model image does not include metal artifacts. Therefore, the model image is an idealized image without metal artifacts. In this case, the model raw data obtained by performing orthographic projection on the model image does not include artifacts data.

At step S205, replaced second raw data is obtained by replacing data at the channels for the metal region in the second raw data with data at the channels for the metal region in the model raw data; and a fourth image is obtained according to the replaced second raw data.

The second raw data includes metal data and artifacts data in the second image. It is noted that in the second raw data, the artifacts data is also located at the channels for the metal region. That is, both the metal data and artifacts data in the second raw data is located at the channels corresponding to the metal region. In an example, the user terminal 102 is configured to obtain the replaced second raw data by replacing data at the channels for the metal region in the second raw data with data at the channels for the metal region in the model raw data. Since the CT values of the metal region in the model image are set to the preset CT value and thus the metal influence is removed in the model raw data, the metal influence is removed in the replaced second raw data. The metal influence refers to metal and metal artifacts caused by the metal.

Back projection is performed on raw data to obtain an image corresponding to the raw data. The user terminal 102 is configured to perform a back projection on the replaced second raw data to obtain a fourth image corresponding to the replaced second raw data. The fourth image removes the metal region and the metal artifacts.

At step S206, a target image is obtained by combining the third image with the fourth image.

The third image corresponds to the metal region in the second image. The fourth image removes the metal region and the metal artifacts. The user terminal 102 may be configured to combine the third image into the fourth image. In an example, the user terminal 102 is configured to obtain the target image by replacing the CT value of each of pixel points in the metal region in the fourth image with the CT value of the pixel point in the third image. The target image includes the metal region without the metal artifacts. The target image can be displayed on a displaying device, such as, the user terminal 102.

In examples of the present disclosure, based on the first image before the metal probe is intervened into the subject and the second image after the metal probe is intervened into the subject, the metal region in the second image and the channels corresponding to the metal region are accurately determined. Compared with the CT threshold segmentation scheme for determining the metal region, the accuracy is higher. In addition, since data at the channels for the metal region in the second raw data is replaced with data at the channels for the metal region in the model raw data, the metal artifacts in the second image are removed, thereby improving the quality of the CT image.

Figure 4:
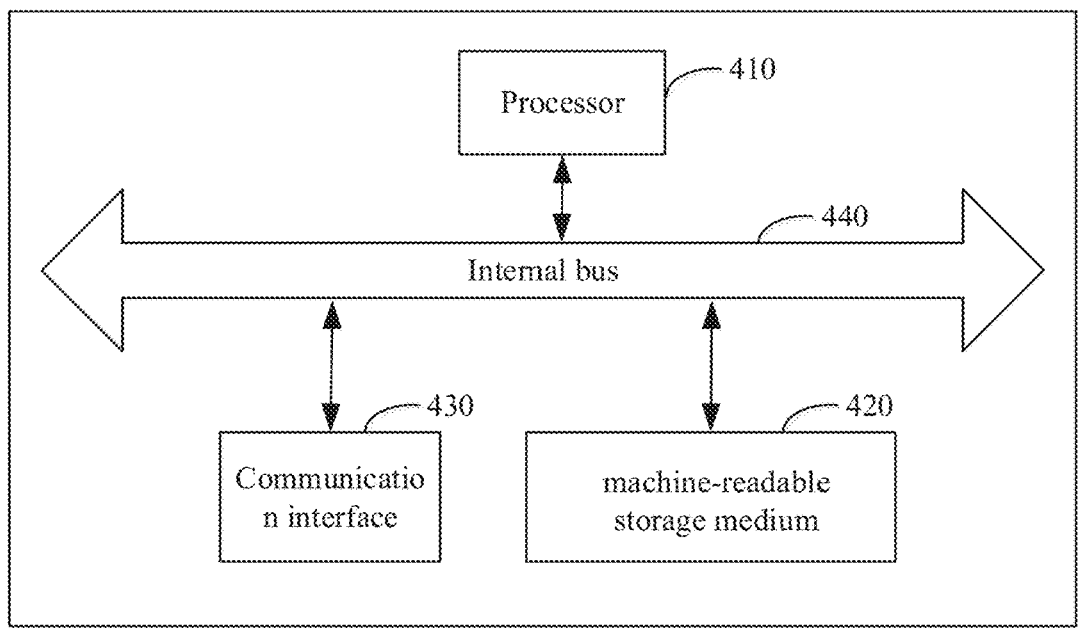
FIG. 4 is a schematic diagram of a hardware structure of a device for processing metal artifacts in a CT image according to one or more examples of the present disclosure.

Based on the method of processing metal artifacts in the CT image provided by the above examples, a device for processing metal artifacts in a CT image is provided. FIG. 4 is a schematic diagram of a hardware structure of a device for processing metal artifacts in a CT image according to one or more examples of the present disclosure. As shown in FIG. 4, the device includes a processor 410, a machine readable storage medium 420, a communication interface 430, and a bus 440. Processor 410, machine readable storage medium 420, and communication interface 430 communicate with each other via bus 440. The device may include other hardware according to actual needs, which is not limited in this application.

In an example, the machine readable storage medium includes RAM (Radom Access Memory), volatile memory, non-volatile memory, flash memory, storage drive (such as a hard drive), solid state drive, any type of storage disk (such as CD, DVD, etc.), or similar storage medium, or a combination thereof.

In an example, by invoking machine executable instructions stored in the machine readable storage medium 420, the processor 410 is caused to perform the above-described method of processing metal artifacts in a CT image.

In an example, a non-transitory machine readable storage medium storing instructions executable by one or more processors and upon such execution cause the one or more processors to perform the above-described method of processing metal artifacts in a CT image.

For simplicity and illustrative purposes, the present disclosure is described by referring mainly to examples thereof. In the above descriptions, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the terms "a" and "an" are intended to denote at least one of a particular element, the term "includes" means including but not limited to, the term "including" means including but not limited to, and the term "based on" means based at least in part on.

The above description is merely some examples of the present disclosure and is not intended to limit the present disclosure in any form. Although the present disclosure is disclosed by the above examples, the examples are not intended to limit the present disclosure. Those skilled in the art, without departing from the scope of the technical scheme of the present disclosure, may make a plurality of changes and modifications of the technical scheme of the present disclosure by the method and technical content disclosed above. Therefore, without departing from the scope of the technical scheme of the present disclosure, based on technical essences of the present disclosure, any equivalent alterations, changes and modifications should fall within the protection scope of the technical scheme of the present disclosure. Accordingly, other embodiments are within the scope of the following claims.

What is claimed is:

1. A method of processing metal artifacts in a CT image, comprising:
   obtaining a first image by scanning a subject under a preset scanning condition before a metal probe is intervened into the subject;
   obtaining raw data and a second image corresponding to the raw data by scanning the subject under the preset scanning condition after the metal probe is intervened into the subject;
   obtaining a third image of a metal region in the second image according to the first image and the second image;
   determining channels corresponding to the metal region according to the third image;
   obtaining a model image and model raw data corresponding to the model image by setting CT values of the metal region in the second image to a preset value, wherein the preset value is different from a CT value of each of substances in the second image;
   obtaining replaced raw data by replacing data at the channels corresponding to the metal region in the raw data with data at the channels corresponding to the metal region in the model raw data;
   generating a fourth image according to the replaced raw data; and
   obtaining a target image by combining the third image with the fourth image.

2. The method of claim 1, wherein obtaining the third image of the metal region in the second image according to the first image and the second image comprises:
   generating a difference image between the second image and the first image by taking the first image as a background image; and
   obtaining the third image by filtering CT values of the difference image.

3. The method of claim 1, wherein setting the CT values of the metal region in the second image to the preset value comprises:
   comparing CT values of the first image with CT values of the second image to obtain a comparison result;
   determining the metal region in the second image based on the comparison result; and
   setting the CT values of the metal region in the second image to the preset value.

4. The method of claim 1, wherein obtaining the model image further comprises:
   determining each of substance regions according to CT values of other regions except the metal region in the second image; and
   for each of the substance regions in the other regions, replacing CT values of the substance region with a designated CT value for a substance in the substance region.

5. The method of claim 4, wherein determining each of the substance regions according to CT values of other regions except the metal region in the second image comprises:
   dividing the other regions except the metal region in the second image into (m+1) number of substance regions with m number of CT thresholds, wherein m is an integer greater than or equal to 1.

6. The method of claim 4, wherein the designated CT value for the substance in the substance region refers to a uniform value of the CT values of the substance region.

7. The method of claim 6, wherein the uniform value of the CT values of the substance region comprises at least one of the following:
   a mean value of the CT values of the substance region;
   an expected value of a normal distribution when the CT values of the substance region follow the normal distribution; or
   a CT value which is the most frequently repeated in the substance region.

8. The method of claim 1, wherein obtaining the model image further comprises:
   determining each of substance regions according to CT values of other regions except the metal region and a bone region in the second image; and
   for each of the substance regions in the other regions, replacing CT values of the substance region with a designated CT value for a substance in the substance region.

9. The method of claim 1, wherein obtaining the target image by combining the third image with the fourth image comprises:
   obtaining the target image by replacing the CT value of each of pixel points in the metal region in the fourth image with the CT value of the pixel point in the third image.

10. The method of claim 1, further comprises:
    displaying the target image on a displaying device.

11. A device for processing metal artifacts in a CT image, comprising:
- a processor; and
- a non-transitory machine readable storage medium;
- by invoking machine executable instructions stored on the non-transitory machine readable storage medium, the processor is caused to:
- obtain a first image by scanning a subject under a preset scanning condition before a metal probe is intervened into the subject;
- obtain raw data and a second image corresponding to the raw data by scanning the subject under the preset scanning condition after the metal probe is intervened into the subject;
- obtain a third image of a metal region in the second image according to the first image and the second image;
- determine channels corresponding to the metal region according to the third image;
- obtain a model image and model raw data corresponding to the model image by setting CT values of the metal region in the second image to a preset value, wherein the preset value is different from a CT value of each of substances in the second image;
- obtain replaced raw data by replacing data at the channels corresponding to the metal region in the raw data with data at the channels corresponding to the metal region in the model raw data;
- generate a fourth image according to the replaced raw data; and
- obtain a target image by combining the third image with the fourth image.

12. The device of claim 11, wherein when obtaining the third image of the metal region in the second image according to the first image and the second image, the processor is caused to:
- generate a difference image between the second image and the first image by taking the first image as a background image; and
- obtain the third image by filtering CT values of the difference image.

13. The device of claim 11, wherein when setting the CT values of the metal region in the second image to the preset value, the processor is caused to:
- compare CT values of the first image with CT values of the second image to obtain a comparison result;
- determine the metal region in the second image based on the comparison result; and
- set the CT values of the metal region in the second image to the preset value.

14. The device of claim 11, wherein when obtaining the model image, the processor is further caused to:
- determine each of substance regions according to CT values of other regions except the metal region in the second image; and
- for each of the substance regions in the other regions, replace CT values of the substance region with a designated CT value for a substance in the substance region.

15. The device of claim 14, wherein when determining each of the substance regions according to CT values of other regions except the metal region in the second image, the processor is caused to:
- divide the other regions except the metal region in the second image into (m+1) number of substance regions with m number of CT thresholds, wherein m is an integer greater than or equal to 1.

16. The device of claim 14, wherein the designated CT value for the substance in the substance region refers to a uniform value of the CT values of the substance region.

17. The device of claim 16, wherein the uniform value of the CT values of the substance region comprises at least one of the following:
- a mean value of the CT values of the substance region;
- an expected value of a normal distribution when the CT values of the substance region follow the normal distribution; or
- a CT value which is the most frequently repeated in the substance region.

18. The device of claim 11, wherein when obtaining the model image, the processor is further caused to:
- determine each of substance regions according to CT values of other regions except the metal region and a bone region in the second image; and
- for each of the substance regions in the other regions, replace CT values of the substance region with a designated CT value for a substance in the substance region.

19. The device of claim 11, wherein when obtaining the target image by combining the third image with the fourth image, the processor is caused to:
- obtain the target image by replacing the CT value of each of pixel points in the metal region in the fourth image with the CT value of the pixel point in the third image.

20. The device of claim 11, the processor is further caused to:
- display the target image on a displaying device.

* * * * *